United States Patent [19]

Gallucci

[11] Patent Number: 4,970,272

[45] Date of Patent: Nov. 13, 1990

[54] POLYPHENYLENE ETHER-POLYAMIDE COMPOSITIONS

[75] Inventor: Robert R. Gallucci, Pittsfield, Mass.

[73] Assignee: General Electric Company, Pittsfield, Mass.

[21] Appl. No.: 303,983

[22] Filed: Jan. 27, 1989

Related U.S. Application Data

[63] Continuation of Ser. No. 816,469, Jan. 6, 1986, abandoned.

[51] Int. Cl.$^5$ .................. C08L 65/00; C08G 65/48
[52] U.S. Cl. ........................... 525/397; 525/133; 524/126; 524/129; 524/149; 524/150; 524/152; 524/155; 524/171; 524/334; 524/341; 524/342; 524/343; 524/344; 524/345; 524/346; 524/347; 524/349; 524/358; 524/538
[58] Field of Search ............... 525/397, 178; 524/126, 524/129, 149, 150, 152, 155, 171, 334, 341, 342, 343, 344, 345, 346, 347, 349, 358

[56] References Cited

U.S. PATENT DOCUMENTS

| | | | |
|---|---|---|---|
| 3,379,792 | 4/1968 | Finholt | 525/397 |
| 3,578,625 | 5/1971 | Nakashio et al. | 524/146 |
| 3,952,072 | 4/1976 | Yonemitsu et al. | 524/117 |
| 4,171,330 | 10/1979 | Kyo et al. | 524/538 |
| 4,315,086 | 2/1981 | Ueno et al. | 525/391 |
| 4,338,421 | 7/1982 | Maruyama et al. | 525/397 |
| 4,513,109 | 4/1985 | Rosenberger | 524/342 |
| 4,628,069 | 12/1986 | Meyer et al. | 524/339 |
| 4,849,474 | 7/1989 | Gallucci . | |

FOREIGN PATENT DOCUMENTS 0131445  1/1985  European Pat. Off. ............ 525/397

*Primary Examiner*—Ana L. Carrillo
*Attorney, Agent, or Firm*—Spencer D. Conard

[57] ABSTRACT

Polyphenylene ether-polyamide compositions having improved resistance to water absorption and swell are provided by incorporating therein a phenolic compound.

15 Claims, No Drawings

POLYPHENYLENE ETHER-POLYAMIDE COMPOSITIONS

This is a continuation of application Ser. No. 816,469, filed Jan. 6, 1986, now abandoned.

The present invention relates to improved polyphenylene ether-polyamide blend compositions. Specifically, the present invention is related to polyphenylene ether-polyamide blends having reduced water absorption and reduced expansion due to water by incorporating therein a phenolic, more specifically a mono phenol, a bisphenol or a polymeric phenol, capable of providing such improvement.

Blends of polyphenylene ether and polyamide are well known. Finholt (U.S. Pat. No. 3,379,792) taught improved processability of polyphenylene ethers by incorporating therein up to 25% by weight polyamide. Similarly, Maruyuma et al (U.S. Pat. No. 4,338,421) taught a process for improving the properties of polyamides by incorporating therein 5 to 70% by weight polyphenylene ether. Subsequently, Ueno et al (U.S. Pat. No. 4,315,086), as well as several other investigators, have found further improvement in the physical properties of polyphenylene ether-polyamide blends by incorporating therein various compatibilizing agents. Such compatibilized blends exhibited excellent stress-strength characteristics combined with high heat resistance. Consequently these compatibilized blends have found particular acceptance in automotive applications and other applications requiring excellent strength characteristics combined with the ability to withstand the heat of paint ovens.

While these polyphenylene ether-polyamide blend compositions did manifest excellent physical characteristics, they suffered as a consequence of exposure to moisture. While in storage, these resin materials tended to absorb moisture quite readily causing a loss of physical properties and more importantly necessitating the drying of the resin for an extended period of time prior to molding. More significantly though, parts molded from the resin material tended to swell and shrink as the humidity of the environment increased and decreased, respectively and as a result of intermittent exposure to water. This is particularly detrimental in automotive applications where tolerance of part size is critical.

It is an object of the present invention to provide polyphenylene ether-polyamide blend compositions having reduced tendency to absorb water without significantly affecting the physical properties of the composition.

It is also an affect of the the present invention to provide such blend composition having improved dimensional stability so that they may be employed in applications having low tolerence for expansion in molded parts.

SUMMARY OF THE INVENTION

It has now been found that polyphenylene ether-polyamide blends may be prepared having reduced water absorption and improved dimensional stability with little, if any, loss of physical properties and without impairing the compatibilization of such blends by incorporating therein one or more phenolic compounds capable of manifesting said improvement.

Specifically, polyphenylene ether-polyamide blend compositions, with or without compatibilizer and with or without an additional impact modified resin are rendered less susceptible to water absorption and expansion due to moisture by incorporating therein at least one phenolic compound represented by the formulae

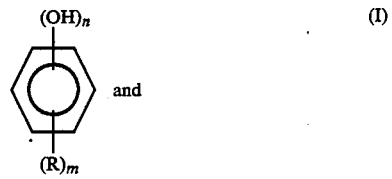

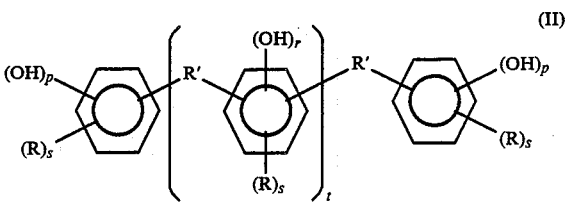

wherein n equals 1, 2 or 3, m equals 3, 4 or 5, and (n+m)=6; p equals 1 or 2, each r is independently equal to 0, 1 or 2, and each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1$-$C_{16}$ alkyl, a $C_6$-$C_{18}$ aryl or a $C_7$-$C_{20}$ arylalkyl radical, any of which may be substituted with a $C_1$-$C_{12}$alkyl group or with a halogen atom and whereby the aryl radical, if present, may be bonded by a —O—, $C_1$-$C_3$ alkylene or alkylidene, or —$SO_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero containing bridges including:

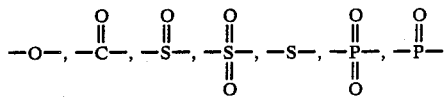

and the like; provided that there are no phenolic hydroxy groups having two adjacent alkyl radicals on the phenol ring with tertiary alpha carbon atoms.

DETAILED DESCRIPTION

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers, particularly graft copolymers of alkenyl aromatic compounds, especially vinyl aromatic compounds, as disclosed below, and a polyphenylene ether.

Suitable phenol compounds for the preparation of the polyphenylene ethers may be represented by the general formula:

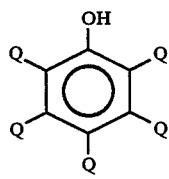

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6-, 2,5-, 2,4- and 3,5- dimethylphenols; 2-methyl-6-phenyl-phenol; 2,6-diphenylphenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinione.

Illustrative of suitable polyphenylene ethers there may be given, for example, poly(2,6 dimethyl1,4-phenylene)ether; poly(2-methyl-1,4-phenylene)ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly(2,3,6-trimethyl-1,4-phenylene) ether; poly(2,3,5,6-tetramethyl-1,4-phenylene)ether; poly(2,6-dichloro-1,4-phenylene)ether; poly(2,6-diphenyl-1,4-phenylene)ether; poly(2,5-dimethyl-1,4-phenylene)ether and the like. Further, as mentioned above, copolymers of the phenol compounds may also be used.

Preferred polyphenylene ethers will have the formula:

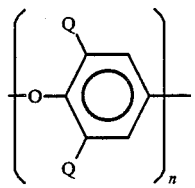

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethyoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly(2-ethyl-6-propyl-1,4-phenylene)ether; and the like; most preferably poly(2,6-dimethyl-1,4-phenylene)ether.

Polyamides suitable for use in the practice of the present invention are well known and widely available. Basically they may be obtained by polymerizing a monoamino-monocarboxylic acid or a lactam thereof having at least 2 carbon atoms between the amino and carboxylic acid group; or by polymerizing substantially equimolecular proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, caprolactam, capryllactam, enantholactam, undecanolactam, dodecanolactam and 3and 4- aminobenzoic acids.

Diamines suitable for use in the preparation of the polyamides include alkyl, aryl and alkyl-aryl diamines. Such diamines include, for example, those represented by the general formula:

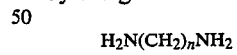

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylylene diamine and the like.

The dicarboxylic acids may be aromatic, for example isophthalic and terephthalic acids or aliphatic wherein the aliphatic dicarboxylic acids are of the formula

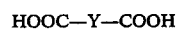

wherein Y represents a divalent aliphatic group containing at least 2 carbon atoms, and examples of such acids are sebacic acid, octadecanedoic acid, suberic acid, glutaric acid, pimelic acid and adipic acid. Typical examples of the polyamides or nylons, as these are often called, include for example

| | |
|---|---|
| polypyrrolidone | (nylon 4) |
| polycaprolactam | (nylon 6) |
| polycapryllactam | (nylon 8) |
| polyhexamethylene adipamide | (nylon 6, 6) |
| polyundecanolactam | (nylon 11) |
| polydodecanolactam | (nylon 12) |
| polyhexamethylene azelaiamide | (nylon 6, 9) |
| polyhexamethylene sebacamide | (nylon 6, 10) |
| polyhexamethylene isophthalimide | (nylon 6, I) |
| polyhexamethylene terephthalamide | (nylon 6, T) |
| polyamide of hexamethylene diamine and n-dodecanedioic acid | (nylon 6, 12) | as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention. Such copolyamides include copolymers of the following:

| | |
|---|---|
| hexamethylene adipamide/caprolactam | (nylon 6, 6/6) |
| hexamethylene adipamide/hexamethylene-isophthalamide | (nylon 6, 6/6, I) |
| hexamethylene adipamide/hexamethylene-terephthalamide | (nylon 6, 6/6, T) |
| hexamethylene adipamide/hexamethylene-azelaiamide | (nylon 6, 6/6, 9) |
| hexamethylene adipamide/hexamethylene-azelaiamide/caprolactam | (nylon 6, 6/6, 9 /6) |

Mixtures and/or copolymers of two or more of the foregoing polyamides or prepolymers thereof, respectively, are also within the scope of the present invention.

Especially preferred polyamides are the polyamides 6; 6,6; 11; 12 and mixture of at least one crystalline polyamide, e.g. 6; 6,6, and at least one amorphous polyamide, e.g. 6,I; 6,I,T; most preferrably polyamide 6,6.

It is also to be understood that the use of the term "polyamides" herein and in the appended claims is intended to include the toughened or super tough polyamides. Super tough polyamides, or super tough nylons, as they are more commonly known, are available commercially, e.g. from E.I. duPont (Zytel® ST resins), Wilson Fiberfill (NY resins), Badische (ULTRAMID® resins), Allied (CARPION® resins) and Celanese (7000 series resins), among others, or may be prepared in accordance with a number of U.S. Patents including, among others, Epstein—U.S. Pat. No. 4,174,358; Novak—U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. Patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425-437 (1982) herein incorporated by reference and are described more fully below. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The blending ratio of polyphenylene ether to polyamide is 5 to 95% by wt. preferably 30 to 70% by wt. of the former to 95 to 5% by wt., preferably 70 to 30% by wt. of the latter. When the polyamide is less that 5 wt. percent, its effect to improve solvent resistance is small, while when it exceeds 95 wt. percent, thermal properties such as heat distortion temperature and dimensional stability tend to become poor.

In the preferred embodiments of the present invention, a compatibilizing agent will be employed in the preparation of the compositions. When used herein and in the appended claims the term "compatibilizing agent" is meant to refer to those polyfunctional, non-rubbery compounds which interact with the polyphenylene ether, the polyamide or both, chemically, e.g. grafting, or physically, e.g. by altering the surface characteristics of the dispersed phase and/or enhancing the dispersion thereof, so as to improved the compatibility of the resin mixture, particularly as evidenced by enhanced impact strength, weld line strength, and/or elongation. Many suitable compatibilizing agents for the polyphenylene ether-polyamide blend are well known, as disclosed above, and additional compatiblizing agents are being identified as more and more is learned about the polyphenylene ether-polyamide system. All such compatibilizing agents are intended to be within the full scope of the present invention.

Exemplary of the various compatibilizing agents that may be employed in the practice of the present invention there may be given:
(a) liquid diene polymers
(b) epoxy compounds
(c) oxidized polyolefin wax
(d) quinones
(e) organosilane compounds and
(f) polyfunctional compounds as described hereinafter.

Liquid diene polymers (a) suitable for use herein include homopolymers of a conjugated diene and copolymers of a conjugated diene with at least one monomer selected from the group consisting of other conjugated dienes; vinyl monomer, e.g. styrene and alphamethyl styrene; olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699 incorporated herein by reference and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene) and the like.

As epoxy compounds (b) suitable for use in the practice of the present invention there may be given (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin; (3) glycidyletherified products of monohydric alcohols and monohydric phenols including phenyl glycidylether, butyl glycidyl ether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean) as well as of the foregoing liquid diene polymers.

Oxidized polyolefin waxes (c) are well known and a description thereof and processes for the production of the same are found in U.S. Pat. Nos. 3,822,227 and 3,756,999 and German Patent Publications 3,047,915 and 2,201,862, herein incorporated by reference. Generally, these are prepared by an oxidation or suspension oxidation of polyolefin. An especially preferred polyolefin wax is "Hoescht Wacks".

Quinone compounds (d) suitable for use herein are characterized as having in the molecule of the unsubstituted derivative at least one 6 membered carbon ring; at least two carbonyl groups in the ring structure, both of which may be in the same or, if more than one ring, different rings, provided that they occupy positions corresponding to the 1,2- or 1,4- orientation of the monocyclic quinone; and at least two carbon-carbon double bonds in the ring structure, said carbon-carbon double bonds and carbonyl carbon-oxygen double bonds being conjugated with respect to each other. Where more than one ring is present in the unsubstituted quinione, the rings may be fused, non-fused or both: non-fused rings may be bound by a direct carbon--carbon double bond or by a hydrocarbon radical having conjugated unsaturation such as =C—C=.

Substituted quinones are also within the scope of the present invention. The degree of substitution; where substitution is desired, may be from one to the maximum number of replaceable hydrogen atoms. Exemplary of the various substituents that may be present on the unsubstituted quinone structures include halogen, e.g. chlorine, bromine, flourine, etc.; hydrocarbon radicals including branched and unbranched, saturated and unsaturated alkyl, aryl, alkyl aryl and cycloalkyl radicals and halogenated derivatives thereof; and similar hydrocarbons having hetero atoms therein, particularly oxygen, sulfur or phosphorous and wherein the same connects the radical to the quinone ring (e.g. oxygen link).

Exemplary of the various quinones there may be given 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro-1,4-benzoquinone; 2,6-dimethyl benzoquinone and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from the group consisting of amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present, being linked through an oxygen link (e.g. siloxanes), a silicon-silicon bond; or a bifunctional organic radical (e.g. methylene or phenylene groups).

Exemplary of suitable organosilane compounds there may be given gamma amino propyltriethoxy silane, 2-(3-cyclohexenyl)ethyl trimethoxy silane; 1,3-divinyl tetraethoxy silane; vinyl tris-(2-methoxyethoxy)silane; 5-(bicycloheptenyl)triethoxy silane and gamma mercapto propyl trimethoxy silane.

Finally, polyfunctional compounds (f) which may be employed as compatibilizer in the practice of the present invention are of three types. The first type of polyfunctional compounds are those having in the molecule both (a) a carbon-carbon double bond or a carbon-carbon triple bond and (b) at least one carboxylic acid, acid anhydride, acid halide, anhydride, acid halide anhydride, acid amide, acid ester, imide, amino, or hydroxy group. Exemplary of such polyfunctional compounds there may be given maleic acid; maleic anhydride; fumaric acid; citraconic acid; itaconic acid; maleimide; maleic hydrazide; reaction products resulting from a diamine and maleic anhydride, maleic acid, fumeric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. allyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formulae $C_nH_{2n-5}OH$, $C_nH_{2n-7}OH$ and $C_nH_{2n-9}OH$, wherein n is a positive integer up to 30), unsaturated amines resulting from replacing the —OH group(s) of the above unsaturated alcohols with $NH_2$ groups; and functionalized diene polymers and copolymers.

The second group of polyfunctional compatibilizer compounds suitable for use herein are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the aliphatic polycarboxylic acids, acid esters and acid amides represented by the formula:

$$(R^IO)_mR(COOR^{II})_n(CONR^{III}R^{IV})_s$$

wherein R is a linear or branched chain, saturated aliphatic hydrocarbon of from 2 to 20, preferably 2 to 10, carbon atoms; $R^I$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein (OR$^J$) is alpha or beta to a carbonyl group and at least two carbonyl groups are separated by 2 to 6 carbon atoms. Obviously, R$^I$, R$^{II}$, R$^{III}$ and R$^{IV}$ cannot be aryl when the respective substituent has less than 6 carbon atoms.

Illustrative of suitable polycarboxylic acids there may be given citric acid, malic acid, and agaricic acid; including the various commercial forms thereof, such as, for example, the anhydrous and hydrated acids. Illustrative of acid esters useful herein include for example, acetyl citrate and mono- and/or di- stearyl citrates and the like. Suitable acid amides useful herein include for example N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Especially preferred derivatives are the salts thereof, including the salts with amines and/ preferably, the alkali and alkaline metal salts. Exemplary of suitable salts include calcium malate, calcium citrate, potasium malate and potasium citrate.

The third group of polyfunctional compatibilizer compounds suitable for use herein are characterized as having in the molecule both (a) an acid halide group, most preferably an acid chloride group and (b) at least one carboxylic acid, carboxylic acid anhydride, acid ester or acid amide group, preferably a carboxylic acid or carboxylic acid anhydride group. Exemplary of compatibilizers within this group there may be given trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride and chloroacetyl glutaric acid, especially preferred is trimellitic anhydride acid chloride. Furthermore, it is especially preferred that compatibilizers of this group be prereacted with at least a portion of the polyphenylene ether.

Each of the foregoing compatibilizing agents are more fully described in U.S. Pat. Nos. 4,315,086; U.S. patent applications Ser. Nos. 669,130, 736,489 and 780,151 filed Nov. 7, 1984, May 20, 1985, and, Sept. 26, 1984, respectively, and European patent application No. 04640, altogether herein incorporated by reference.

The foregoing compatibilizing agents may be used alone or in any combination of one another. Furthermore, they may be added directly to the melt blend or precompounded with either or both the polyphenylene oxide and polyamide as well as with other resinous materials employed in the preparation of the compositions of the present invention. With many of the foregoing compatibilizing agents, particularly the polyfunctional compounds, even greater improvement in compatibility is found where at least a portion of the compatibilizing agent is precompounded with all or a part of the polyphenylene oxide. It is believed that such precompounding may cause the compatiblizing agent to react with the polymer and, consequently, functionalize that polymer. For example, the polyphenylene oxide may be precompounded with trimellitic acid chloride anhydride to form an anhydride functionalized polyphenylene ether which has improved compatibility with the polyamide than the non-functionalized polyphenylene ether.

Where the compatibilizing agent is employed in the preparation of the compositions of the present invention, the total amount used will be dependent upon the specific compatibilizing agent chosen and the specific polymeric system to which it is added as discussed in the foregoing references. Obviously, it is desirable to employ at least that amount which is necessary to enhance the compatibility of the polyphenylene ether polyamide blend. In general, the amount of compatibilizing agent will be from about 0.01 to about 30, preferably from about 0.1 to about 10, most preferably from about 0.1 to about 5 parts by weight per 100 parts by weight of the blend of polyphenylene ether and polyamide. It should be noted that where the compatibilizing agent is precompounded with or prereacted with a component of the composition, or a portion thereof, e.g. polyphenylene oxide, the weight amount pertains solely to the unreacted (pre-precompounded) compatibilizing agent, not the functionalized or precompounded material even though the latter may act as a compatiblizer itself. Thus, for example, if 35 parts by weight of polyphenylene ether were precompounded with 0.7 parts by weight trimellitic anhydride acid chloride and subsequently blended with an additional 15 parts by weight polyphenylene oxide and 50 parts by weight of polyamides, such composition would still be within the scope of the present invention. The 0.7 parts trimellitic anhydride acid chloride is the amount of compatibilizing agent employed not the 35.7 parts of precompounded product.

The above-mentioned compatibilizing agent may be employed alone or in combination with a primary or secondary amine. With certain of the foregoing compatibilizers, especially the polyfunctional compounds, it has been found that the presence of the amine often enhances certain physical properties, especially brightness of the compositions. Suitable amines include those primary and secondary amines having from 1 to about 20, preferably from 1 to about 10 carbon atoms. Illustrative of said suitable amines there may be given, methyl ethylamine, diethylamine, butylamine, dibutylamine; aniline, n-octadecylamine and the like. The amount of the primary or secondary amine to be used is generally up to about 3 parts by wt., preferably from about 0.35 to about 1.5 parts by wt., based on 100 parts of the combination of polyphenylene ether and polyamide.

The benefits of the present invention are realized by incorporating in the polyphenylene ether-polyamide blend an effective amount of a phenolic compound or phenol polymer or oligomer capable of reducing undesired and detrimental characteristic of water absorption in the blend. Suitable phenolic compounds, oligomers and polymers are selected from the group consisting of a) mono-, di- and polyphenols of the formula:

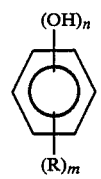

(I)

and bisphenols and higher phenols of the formula:

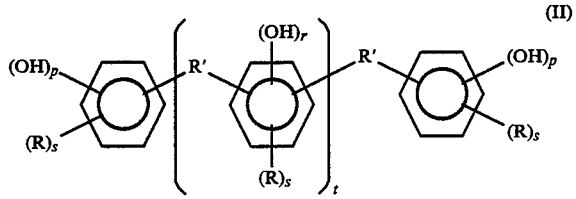

(II)

wherein n equals 1, 2 or 3, m equals 3, 4 or 5, and (n+m)=6; p equals 1 or 2, each r is independently equal to 0, 1 or 2, and each s is independently equal to 0, 1, 2, 3 or 4 as appropriate; t equals 0, 1, 2, 3 or 4; each R is independently hydrogen; halogen, e.g. bromine, chlorine, fluorine, etc.; a $C_1-C_{16}$ alkyl, a $C_6-C_{18}$ aryl or a $C_7-C_{20}$ arylalkyl radical, any of which may be substituted with a $C_1-C_{12}$ alkyl group or with a halogen atom and whereby the aryl radical, if present, may be bonded by a —O—, $C_1-C_3$ alkylene or alkylidene, or —SO$_2$— bridge member; or a hydroxy aryl or alkyl hydroxy aryl radical; and each R' is independently selected from the group consisting of a direct carbon-carbon bond or a bridge member selected from the group consisting of divalent alkyl, aryl, arylalkyl, hydroxy aryl or alkyl hydroxy aryl radicals, including halogen substituted derivatives of each; divalent ester and amide radicals; and hetero containing bridges including:

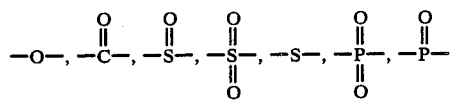

and the like; provided that there are no phenolic hydroxy groups having two adjacent alkyl radicals on the phenol ring with tertiary alpha carbon atoms; and (b) oligomeric and polymeric phenols characterized as having free (i.e. unreacted) phenolic hydroxy groups along the oligomer or polymer chain or in pendant phenol radicals attached to the oligomer or polymer chain.

Exemplary of suitable mono-, di- and polyphenols according to formula I above, there may be given decanaphthol, 2-butyl phenol(sec and tert), 4-t-butyl phenol, thymol, 4-t-pentyl phenol, octylphenols, nonyl phenols, dodecyl phenols, 4-hydroxy diphenyl, 2-hydroxy diphenyl, alkyl substituted hydroxy diphenyls (as disclosed in German application 1943230), 1-naphthol, 2-naphthol, benzy phenols, benzyl cresols, 2-phenyl-2-(4-hydroxy phenyl) propane, 4-hydroxydiphenyl sulfone, 4-hydroxydiphenyl ether, 2- and 4-cyclohexylphenol, resorcinol, hydroquinone, 1,2,4-benzenetriol, phloroglucinol and mixtures thereof. Especially preferred are the nonyl phenols, dodecyl phenol, 2-hydroxy biphenyl, and 2-phenyl-2-(4-hydroxy phenyl)-propane.

Exemplary of suitable bisphenols and polyphenols according to formula II there may be given 2,2-bis(4-hydroxyphenyl) propane; bis(4-hydroxyphenyl)methane; 2,2-bis(4-hydroxyphenyl)heptane; 2,2-bis(3-chloro-4 hydroxyphenyl)propane; 2,2-bis(3,5-dichloro-4-hydroxyphenyl)propane; 2,2-bis(3,5-dibromo-4-hydroxyphenyl)propane; 2,2-bis(3-methyl-4-hydroxyphenyl)propane; 4,4'-(p-phenylenediisopropylidene)-bis(2,6-xylenol); 4,4'-(p-phenylenediisopropylidene)bisphenol; methylene bisphenol; biphenol; naphthalenediol; 4,4'-cyclohexylidene bisphenol; alpha, alpha', alpha"-tris(4-hydroxyphenyl)-1,2,5-triisopropylbenzene; 2,2-bis(3,5-dimethyl-4-hydroxyphenyl)sulfone; 2,2-bis(4-hydroxyphenyl)sulfone; 2,2-bis(2,4-dihydroxyphenyl)sulfone; and the like. Especially preferred is 2,2-bis(4-hydroxyphenyl)propane.

Exemplary of suitable oligomeric and polymeric phenols there may be given the polyvinyl phenols and the phenol-formaldehyde resins(e.g. novalak and resol resins). Generally such polymeric phenols will have a number average nolecular weight of up to 40,000, preferably from about 400 to 30,000.

The amount by which the phenol compound or polymer will be employed in the practice of the present invention is that amount capable of providing dimensional stability and reducing water absorption in the polyphenylene ether-polyamide composition, preferably at least 10% improvement as compared to similar compositions prepared without the phenol. Generally, the amount of the phenol will be from about 0.5 to about 30, preferably from about 1 to about 20, most preferably from about 1.5 to about 10 parts by weight per 100 parts by weight of the mixture of polyphenylene ether and polyamide. The specific amount of phenol compound or polymer employed will depend in part upon the efficacy of the phenol itself, the weight ratio of polyamide to polyphenylene ether in the resin mixture and the extractability of the phenol upon conditioning and/or processing of the material.

In the practice of the present invention, it may be further desirable to add an additional modifier resin or resin combination to further improve the physical properties, particularly the impact strength, and/or processability of the composition. Such modifier resins are well known in the art and are typically derived from one or more monomers selected from the group consisting of olefins, vinyl aromatic monomers, acrylic or alkyl acrylic acids and their ester derivatives as well as conjugated dienes. Especially preferred modifier resins are the rubbery high-molecular weight materials including natural and synthetic polymeric materials showing elasticity at room temperature. Suitable modifier resins include both homopolymers and copolymers, including random, block, radial block, graft and core-shell copolymers as well as combinations thereof.

Polyolefins or olefin-based copolymer employable in the practice of the present invention include, among others, low density polyethylene, high density polyethylene, linear low density polyethylene, isotactic polypropylene, poly(1-butene), poly(4-methyl-1-pentene), propylene-ethylene copolymers, and the like. Additional olefin copolymers include copolymers of one or more alpha olefins, particularly ethylene, with copolymerizeable monomers including for example vinyl acetate, acrylic acids and alkyl acrylic acids as well as the ester derivatives thereof including for example, ethylene acrylic acid, ethylacrylate, methacrylic acid, methyl methacrylate and the like. Finally, an additional class of olefin-based copolymers suitable for use herein include the ionomer resins, which may be wholly or partially neutralized with metal ions.

A second class of modifier resins employable herein are those derived from the vinyl aromatic monomers. These include, for example, modified and unmodified polystyrenes, ABS type graft copolymers; AB and ABA type block and radial block copolymers and vinyl aromatic conjugated diene core-shell graft copolymers. Modified and unmodified polystyrenes include homopolystyrenes and rubber modified polystyrenes, such as butadiene rubber modified polystyrene otherwise referred to as high impact polystyrene or HIPS. Additional useful polystyrenes include copolymers of styrene and various monomers, including for example, poly(styrene-acrylonitrile) (SAN), styrene-butadiene copolymers as well as the modified alpha and para substituted styrenes and any of the styrene resins disclosed in U.S. Pat. No. 3,383,435, herein incorporated by reference. ABS type of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenyl arene monomers and substituted derivatives thereof as well as acrylic monomers such as acrylonitriles and acrylic and alkyl acrylic acids and their esters.

An especially preferred class of vinyl aromatic monomer derived polymer resins are the block copolymers comprising monoalkenyl arene blocks and hydrogenated, partially hydrogenated and non-hydrogenated conjugated diene blocks and represented as AB and ABA block copolymers. Suitable AB type block copolymers are disclosed in for example U.S. Pat. Nos. 3,078,254; 3,402,159; 3,297,793; 3,265,765; and 3,594,452 and UK Patent No. 1,264,741, all herein incorporated by reference. Exemplary of typical species of AB block copolymers there may be given:

polystyrene-polybutadiene (SBR)
polystyrene-polyisoprene and
poly(alpha-methylstyrene)-polybutadiene.

Such AB block copolymers are available commercially from a number of sources including Phillips under the trademark Solprene.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Exemplary of typical species of triblock copolymers there may be given:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methystyrene).

A particularly preferred class of such triblock copolymers are available commercially as CARIFLEX ®, KRATON D ® and KRATON G ® from Shell.

A third class of modifier resins suitable for use in the instant invention are those derived from conjugated dienes. While many copolymers containing conjugated dienes have been discussed above, additional conjugated diene modifier resins include for example homopolymers and copolymers of one or more conjugated dienes including for example polybutadiene, butadiene-styrene copolymers, isoprene-isobutylene copolymers, chlorobutadiene polymers, butadiene-acrylonitrile copolymers, polyisoprene, and the like. Finally, ethylene-propylene-diene monomer rubbers are also intended to be within the full scope of the present invention. These EPDMs are typified as comprising prodominately ethylene units, a moderate amount of propylene units and only a minor amount, up to about 20 mole % of diene monomer units. Many such EPDM's and processes for the production thereof are disclosed in U.S. Pat. Nos. 2,933,480; 3,000,866; 3,407,158; 3,093,621 and 3,379,701, herein incorporated by reference.

An additional group of modifier resins employable in the instant invention are the core-shell type graft copolymers. In general, these are characterized as having a predominately conjugated diene rubbery core or a predominately cross-linked acrylate rubbery core and one or more shells polymerized thereon and derived from monoalkenyl arene and/or acrylic monomers alone or, preferably, in combination with other vinyl monomers. Such core-shell copolymers are widely available commercially, for example, from Rohm and Haas Company under the tradenames KM-611, KM-653 and KM-330, and are described in U.S. Pat. Nos. 3,808,180; 4,034,013; 4,096,202; 4,180,494 and 4,292,233.

Also within the scope of the present invention are the core-shell copolymers wherein an interpenetrating network of the resins employed characterizes the interface between the core and shell. Especially preferred in this regard are the ASA type copolymers available from General Electric Company and sold as GELOY TM resin and described in U.S. Pat. No. 3,944,631.

It is also to be understood that in addition to the straight polymers and copolymers described above, there may be employed such polymers and copolymers having copolymerized therewith or grafted thereon monomers having functional groups and/or polar or active groups. Such functional groups include epoxy, amine, amide, thio, ether, ester, carboxy, anhydride, carbonyl, carboxylic acid anhydride and other like highly polar groups. Such functionalized or activated polymers and copolymers are described in the above-mentioned Epstein, Novak, Roura, Joffrion, Caywood, Swiger and Gallucci references cited above with respect to the discussion on toughened polyamides. All of such functionalized or activated polymers and copolymers may be directly blended with the ingredients to the present compositions or, as described above, may be precompounded with a polyamide or polyphenylene ether. It is especially preferred to precompound the functionalized or activated polymer or copolymer with the polyamide to prepare a toughened or super tough polyamide which is then employed in preparing the polyphenylene etherpolyamide composition of the present invention.

Finally, other suitable modifier resins and high molecular weight rubbery materials which may be employed in the practice of the present invention include for example thiokol rubber, polysulfide rubber, polyurethane rubber, polyether rubber (e.g. polypropylene oxide), epichlorhydrin rubber, ethylene propylene rubber, thermoplastic polyester elastomers, thermoplastic ether-ester elastomers and the like.

The amount of the rubbery polymer used will be up to about 100 parts by weight, preferably from about 5 to about 50 parts by weight most preferably from about 5 to about 25 parts by weight, based on 100 parts by weight of the mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. Thus, in the interest of balancing impact resistance and other physical properties, it is preferred to use less than 100 parts by weight of the rubbery polymer. It is also to be understood that combinations of the above-mentioned modifier resins may be employed and are within the full intended scope of the present invention.

Finally, in addition to the foregoing, the polyphenylene ether-polyamide resin compositions of the present invention may further comprise other reinforcing additives, including glass fibers, carbon fibers, mineral fillers and the like as well as various flame retardants, colorants, stabilizers and the like known to those skilled in the art.

When employed in the practice of the present invention, reinforcing additives should be used in an amount up to no more than about 50 wt. % based on the total composition, preferably no more than about 30 wt. %. Especially preferred reinforcing additives are the filamentous and chopped glass fibers. Such glass fibers may be untreated or, preferably, treated with a silane or titanate coupling agent, and are well known in the art and widely available from a number of manufacturers.

Suitable stabilizers for use in the practice of the present invention generally include most any of the known thermal and oxidative stabilizers suitable for use with either polyamides or polyphenylene ethers. Especially preferred are those stabilizers suitable for use with polyamides. For example, liquid phosphates and hindered phenols may be employed as well as stabilizer packages encompassing combinations of hindered phenols and potassium and cuprous salts.

The method for producing the resin compositions of the present invention is not particularly limited, and the conventional methods are satisfactorily employed. Generally, however, melt blending methods are desirable. The time and temperature required for meltblending are not particularly limited, and they can properly be determined according to the composition of the material. The temperature varies somewhat with the blending ratio of the polyphenylene ether to polyamide, but it is generally within a range of 270° to 350° C. A prolonged time and/or a high shear rate is desirable for mixing, but the deterioration of the resin composition advances. Consequently, the time needs to be determined taking into account these points.

Any of the melt-blending methods may be used if it can handle a molten viscous mass. The method may be applied in either a batchwise form or a continuous form. Specifically, extruders, Bambury mixers, rollers, kneaders and the like may be exemplified.

Furthermore, the sequence of processing steps in the preparation of the present invention may also vary widely, with certain sequences providing superior properties in the final product as compared to other sequences. For example, all ingredients may be initially and directly added to the processing system or certain ingredients or portions thereof may be precompounded with one matter prior to blending with the remainder of the ingredients. It is this latter process which often results in impaired physical properties.

Although the exact physical configuration of the compositions of the present invention is not known, it is generally believed that the compositions comprise a dispersion of one polymer component in the other. Applicant believes the likely configuration is wherein the polyphenylene ether is dispersed in a polyamide matrix. However, the inverse may also be possible particularly where the polyamide component is present in only a minor amount. Where the compatibilizing agent is employed, applicant contemplates that there may be present in the products produced therby some graft polyphenylene ether-polyamide products wherein the compatibilizing agent may, at least in part, promote grafting and/or act as a graft-linking agent itself. Thus, all such dispersions as well as graft, partially grafted and non-grafted products are within the full intended scope of the invention.

The following examples are presented in order that those skilled in the art may better understand how to practice the present invention. These examples are merely presented by way of illustration and are not intended to limit the invention thereto. Unless otherwise stated, all formulations are expressed in terms of parts by weight.

All blends were prepared by extrusion on either a single screw or twin screw extruder at 250°-300° C. All ingredients were mixed and fed together. Blend compositions were injection molded after drying for preparation of test parts. Moisture absorption was measured as weight gain of a Gardner chip immersed in deionized water for the period of time and at the temperature indicated.

EXAMPLES 1-2, COMPARATIVE EXAMPLES A-B

A series of compositions were prepared demonstrating the present invention in non-compatibilized polyphenylene ether-polyamide blends The specific compositions and the properties thereof were as shown in Table 1.

EXAMPLES 3-6, COMPARATIVE EXAMPLES C-F

A series of compositions was prepared demonstrating the present invention in compatibilized, impact modified and combined compatibilized/impact modified polyphenylene ether-polyamide blend compositions. The specific formulation and the physical properties thereof were as shown in Table 2.

TABLE 1

|  | A | 1 | B | 2 |
|---|---|---|---|---|
| polyphenylene ether[a] | 50 | 50 | 50 | 50 |
| polyamide 6 | 50 | 50 | — | — |
| polyamide 6, 6 | — | — | 50 | 50 |
| bisphenol A[b] | — | 3 | — | 5 |
| % weight gain* | 3.4 | 2.5(29) | 4.0 | 3.1(22) |
| expansion* mils/in |  | 9.5 |  | 6.9(27) |

[a] poly (2,6-dimethyl-1,4-phenylene) oxide from General Electric Company
[b] 2,2-bis(4-hydroxyphenyl)propane
*40 hour immersion in water at 75° C. The number in parenthesis represents the % improvement over the control From Table 2, not only is water absorption reduced, but the addition of the bisphenol also enhanced the stress-strength characteristics of the composition, particularly as shown in examples D, E and 4.

EXAMPLES 7-13, COMPARATIVE EXAMPLES 6

A series of compositions were prepared demonstrating the effectiveness of various phenolic compounds within the scope of the present invention. The specific formulations and physical properties thereof were as shown in Table 3. Each composition comprised 45 parts by weight poly(2,6-dimethyl-1,4-phenylene)ether, 45 parts by weight polyamide 6,6, 10 parts by weight styrene-hydrogenated butadiene-styrene triblock copolymer, either 0.7 parts citric acid monohydrate(CAH) or 0.35 parts maleic amhydride(MA) as compatibilizer (as indicated) and the identified phenolic compound.

EXAMPLES 14-17, COMPARATIVE EXAMPLES H-J

Three series of compositions were prepared further demonstrating various embodiments of the present invention, including particularly compositions employing a polymeric phenol, i.e. polyvinyl phenols. The specific formulations and physical properties thereof were as shown in Table 4.

Further evaluation of the composition of Example 17 and Comparative Example J demonstrated only a minor loss in notched Izod (3.0 v 3.8) while maintaining, for the most part, other physical characteristics, e.g. tensile strength at yield (7.8 v 7.9 psi), flexural modulus (250,000 v 246,000 psi) and Dynatup (49.8 v 50.2 ft.lb). While a modest loss did arise in % elongation (45 v 68), surprisingly spiral flow was significantly improved (24.5 v 20.8 in, ⅛" flow at 525° F.).

EXAMPLES 18-23, COMPARATIVE EXAMPLES K-L

Two series of compositions were prepared demonstrating the effect of various loadings of nonyl phenol and bisphenol A in an impact modified, compatibilized polyphenylene ether polyamide blend. The specific formulations and the properties thereof were as shown in Table 5.

Obviously, other modifications and variations of the present invention are possible in light of the above teachings. It is therefore to be understood that changes may be made in the particular embodiments of the invention described which are within the full intended scope of the invention as defined by the appended claims.

TABLE 2

|  | C | 3 | D | E | 4 | F | 5 | 6 |
|---|---|---|---|---|---|---|---|---|
| polyphenylene ether[a] | 50 | 50 | 45 | 45 | 45 | 49 | 49 | 49 |
| polyamide 6 | 50 | 60 | 45 | 45 | 45 | — | — | — |
| polyamide 6, 6 | — | — | — | — | — | 41 | 41 | 41 |
| SEBS[b] | — | — | 10 | 10 | 10 | 10 | 10 | 10 |
| CAH[c] | — | 0.7 | — | 0.7 | 0.7 | 0.55 | — | 0.55 |
| bisphenol A | — | 3.0 | — | — | 3.0 | — | — | — |
| nonyl phenol | — | — | — | — | — | — | 2.0 | 2.0 |
| % weight gain* | 3.39 | 2.57 (24) | 2.93 | 2.87 | 2.42 (17) | 2.45 | 2.15 (12) | 2.02 (18) |
| Notched Izod ft. lb./in. | 0.3 | 0.7 | 0.3 | 2.4 | 4.4 | 3.0 | 1.0 | 3.1 |

[a]see note a Table 1
[b]styrene-hydrogenated butadiene-styrene triblock copolymer from shell
[c]citric acid mono hydrate compatibilizer
*21 day immersion in water at room temperature. The number in parenthesis indicates the improvement over the control.

TABLE 3

| Example | Additive | Amount (parts) | Compatibilizer | % Weight gain* | Notched Izod ft. lb/in | % Elongation |
|---|---|---|---|---|---|---|
| G | none | — | CAH | 2.43 | 3.1 | 38 |
| 7 | bisphenol A | 3.0 | CAH | 1.92 | 3.3 | 32 |
| 8 | tetramethylbisphenol A | 3.0 | CAH | 2.01 | 3.3 | 30 |
| 9 | p-cumyl phenol | 3.0 | CAH | 2.14 | 3.9 | 25 |
| 10 | resorcinol | 2.0 | CAH | 2.25 | 3.2 | 34 |
| 11 | 4,4'-sulfonyl diphenol | 2.0 | MA | 2.20 | 2.9 | 30 |
| 12 | tetrabromo bisphenol A | 4.0 | CAH | 2.26 | 0.9 | 2 |

*21 day immersion in water at room temperature.

TABLE 4

|  | H | 14 | 15 | I | 16 | J | 17 |
|---|---|---|---|---|---|---|---|
| polyphenylene ether[a] | 45 | 45 | 45 | 45 | 45 | 49 | 49 |
| polyamide 6, 6 | 45 | 45 | 45 | — | — | 41 | 41 |
| polyamide 6, 9 | — | — | — | 45 | 45 | — | — |
| SEBS triblock copolymer[b] | 10 | 10 | 10 | 10 | 10 | 10 | 10 |
| maleic anhydride | 0.35 | 0.35 | 0.35 | 0.35 | 0.35 | 0.35 | 0.35 |
| polyvinyl phenol 1[c] | — | 3.0 | — | — | — | — | — |
| polyvinyl phenol 2[d] | — | — | 3.0 | — | — | — | — |
| bisphenol A | — | — | — | — | 3.0 | — | 3.0 |
| % weight gain | 2.82 | 2.12 (25) | 2.13 (24) | 2.38 | 1.84 (23) | 2.15 | 1.87 (13) |
| expansion (mils/in) | 7.0 | 5.0 (29) | 5.5 (21) | 4.3 | 3.3 (23) | — | — |

[a,b]see notes a and b, Table 2
[c]number average molecular weight 1500–7000
[d]number average molecular weight 30,000

TABLE 5

|  | K | 18 | 19 | 20 | L | 21 | 22 | 23 |
|---|---|---|---|---|---|---|---|---|
| polyphenylene ether[a] | 49 | 49 | 49 | 49 | 45 | 45 | 45 | 45 |
| polyamide 6, 6 | 41 | 41 | 41 | 41 | 45 | 45 | 45 | 45 |
| SEBS triblock copolymer[b] | 10 | 10 | 10 | 10 | 10 | 10 | 10 | 10 |
| citric acid monohydrate | 0.7 | 0.7 | 0.7 | 0.7 | 0.55 | 0.55 | 0.55 | 0.55 |
| nonyl phenol | — | — | — | — | — | 2.0 | 4.0 | 8.0 |
| bisphenol A | — | 3.0 | 5.0 | 10 | — | — | — | — |
| % weight gain* | 2.43 | 1.92 | 1.72 | 1.37 | 2.45 | 2.02 | 1.86 | 1.56 |

TABLE 5-continued

|  | K | 18 | 19 | 20 | L | 21 | 22 | 23 |
|---|---|---|---|---|---|---|---|---|
| expansion* mils/in | 8.9 | 6.4 | 4.5 | 3.1 | — | — | — |  |

*40 hour immersion in water at 75° C. for Examples K-2, 21 day immersion in water at room temperature for Examples L-23.
$a,b$see notes a and b, Table 2

We claim:
1. An improved polyphenylene ether-polyamide composition exhibiting reduced water absorption and improved resistance to swell upon exposure to moisture consisting essentially of:
   (a) at least one polyphenylene ether;
   (b) at least one polyamide; and
   (c) an effective water absorption reducing amount of at least one effective polyhydric phenol, said amount being from about 1 to about 20 parts by weight of said polyhydric phenol per 100 parts by weight of (a) and (b), selected from polyhydric phenols represented by the formulae:

(I)

(II)

wherein
n has a value of from 2 to 3 inclusive,
m has a value of from 3 to 4 inclusive and (n+m)=6,
p is one or two,
each r independently has a value of from 0 to 2 inclusive,
each s independently has a value of from 2 to 4 inclusive,
t has a value of from 0 to 4 inclusive,
each R is hydrogen, and
each R' independently selected from a direct carbon-carbon bond or a bridge member selected from divalent alkyl, aryl, arylalkyl, hydroxy aryl or alkyl hydroxy aryl, including halogen substituted derivatives thereof, divalent ester or amide radicals, and hetero atom containing bridges selected from $$-O-, -\underset{\parallel}{\overset{O}{C}}-, -\underset{\parallel}{\overset{O}{S}}-, -\underset{\underset{\parallel}{O}}{\overset{\overset{\parallel}{O}}{S}}-, -S-, -\underset{\parallel}{\overset{O}{P}}- \text{ and } -\underset{\underset{\parallel}{O}}{\overset{\overset{\parallel}{O}}{P}}-,$$

provided that there are no phenolic hydroxy groups having two adjacent alkyl radicals to the phenyl ring with tertiary alpha carbon atoms.

2. The composition of claim 1 which contains from about 1.5 to about 10 parts by weight of said polyhydric phenol per one hundred parts by weight of the mixture of polyphenylene ether and polyamide.

3. The composition of claim 1 wherein said polyhydric phenol is II.

4. The composition of claim 3 wherein t is zero.

5. The composition of claim 4 wherein p is one.

6. The composition of claim 5 wherein R' is selected from a direct carbon-carbon bond or a bridge member selected from divalent alkyl, aryl, arylakyl, $$-O-, -\underset{\parallel}{\overset{O}{C}}-, -S-, -\underset{\parallel}{\overset{O}{S}}-, -\underset{\underset{\parallel}{O}}{\overset{\overset{\parallel}{O}}{S}}-, -\underset{\parallel}{\overset{O}{P}}-, \text{ or } -\underset{\underset{\parallel}{O}}{\overset{\overset{\parallel}{O}}{P}}-.$$

7. The composition of claim 6 wherein R' is selected from divalent alkyl radicals.

8. The composition of claim 7 wherein said divalent alkyl radical is the isopropylidene radical.

9. The composition of claim 1 which further contains a filler.

10. The composition of claim 9 wherein said filler is glass.

11. The composition of claim 9 wherein said filler is a mineral filler.

12. The composition of claim 1 which further contains a flame retardant amount of at least one flame retardant compound.

13. A polyphenylene ether-polyamide composition comprising:
   (a) at least one polyphenylene ether;
   (b) at least one polyamide; and
   (c) 2,2-bis(4-hydroxyphenyl)propane present in an amount selected from 0.5 to 30 parts by weight per 100 parts by weight of the combination of polyphenylene ether and polyamide, the blending ratio of polyphenylene ether to polyamide being from 5 to 95% by weight of polyphenylene ether to 95 to 5% by weight of the polyamide.

14. The composition of claim 13 wherein said 2,2-bis(4-hydroxyphenyl)propane is present in an amount selected from 1 to 20 parts by weight per 100 parts by weight of the combination of polyphenylene ether and polyamide.

15. The composition of claim 14 wherein the blending ratio of polyphenylene ether to polyamide is from 30 to 70% by weight of polyphenylene ether to 70 to 30% by weight of the polyamide.

* * * * *